United States Patent [19]

Hazeltine et al.

[11] 4,140,220
[45] Feb. 20, 1979

[54] COLOR RECOGNITION SYSTEM

[75] Inventors: Barrett Hazeltine; Edgar De Meo, both of Providence, R.I.; Richard M. Simon, Dix Hill, N.Y.

[73] Assignee: U.S. Billiards, Inc., Amityville, N.Y.

[21] Appl. No.: 788,612

[22] Filed: Apr. 18, 1977

Related U.S. Application Data

[63] Continuation of Ser. No. 619,896, Oct. 6, 1975, Pat. No. 4,042,491.

[51] Int. Cl.² .......................................... B07C 5/342
[52] U.S. Cl. .................................... 209/580; 209/587; 250/226; 356/407; 356/448
[58] Field of Search ................. 209/73, 74 R, 111.6, 209/111.7 R; 250/223 R, 226, 578; 356/173, 195, 209, 212

[56] References Cited

U.S. PATENT DOCUMENTS

| | | | |
|---|---|---|---|
| 1,774,433 | 8/1930 | Gardiner | 209/111.6 X |
| 2,574,030 | 11/1951 | Green | 209/111.6 X |
| 3,206,022 | 9/1965 | Roberts et al. | 209/111.6 X |
| 3,382,975 | 5/1968 | Hoover | 209/111.6 X |
| 3,599,771 | 8/1971 | Hinterstocker | 194/100 A |

*Primary Examiner*—Joseph J. Rolla
*Attorney, Agent, or Firm*—Amster, Rothstein & Engelberg

[57] ABSTRACT

A color recognition system is used to distinguish between objects of various colors. A plurality of light sources are arranged at a sensing station to reflect light from the object as it passes the sensing station to a plurality of cooperatively mounted light detectors. The signals produced by the plurality of detectors are compared with a reference voltage and the comparison utilized to differentiate between objects of different colors passing the sensing station. In a particular embodiment of the invention, the color recognition system is incorporated in a ball separator for a pool table to separate the entirely white cue ball from the partially or wholly differently colored object balls and to divert the cue ball into a first storage station and the object balls into a separate storage station.

7 Claims, 7 Drawing Figures

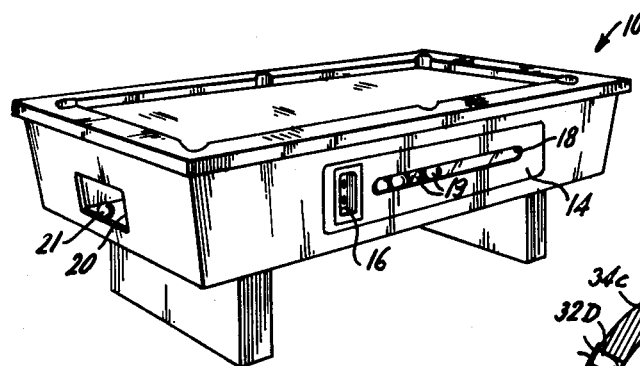
FIG. 1.
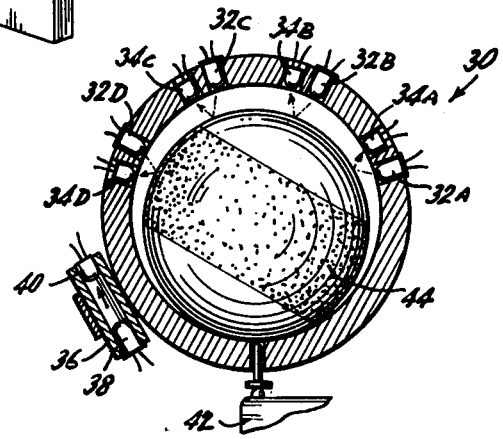
FIG. 7.
FIG. 2.
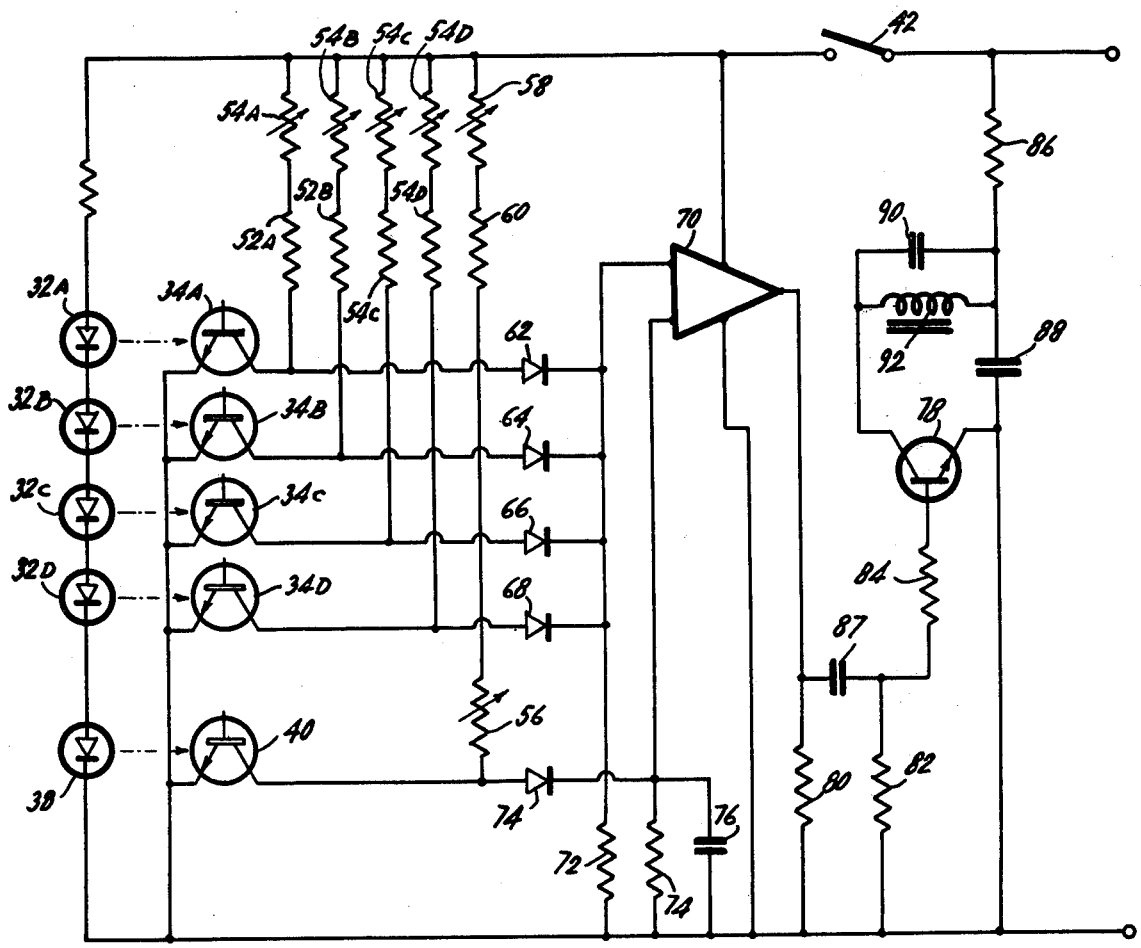

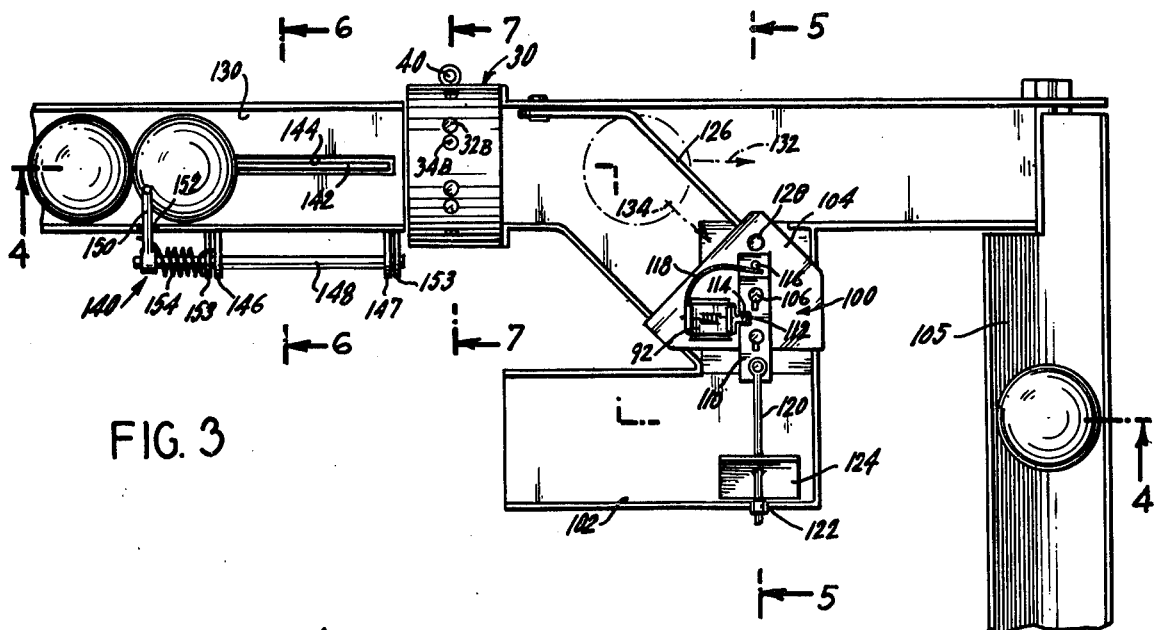
FIG. 3
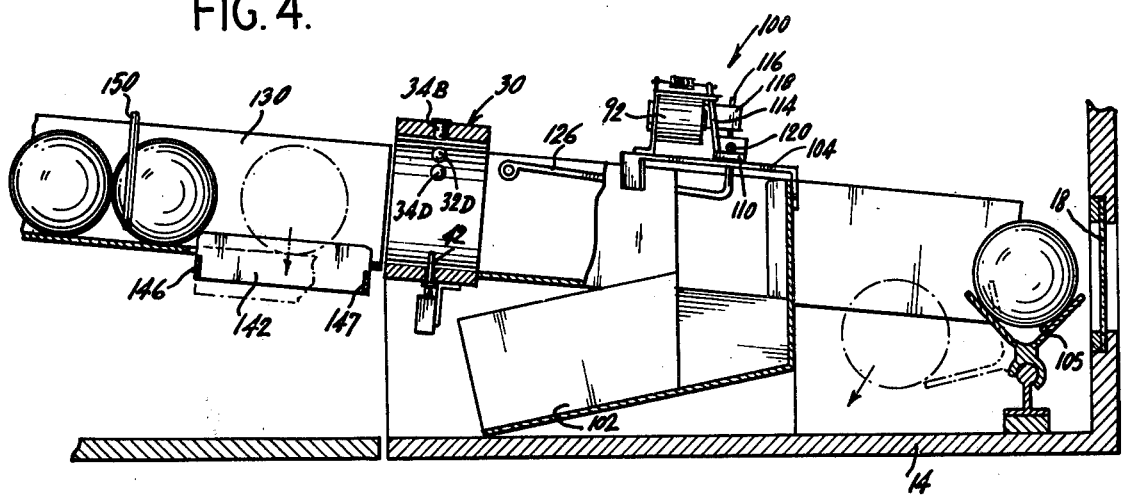
FIG. 4.
FIG. 6.
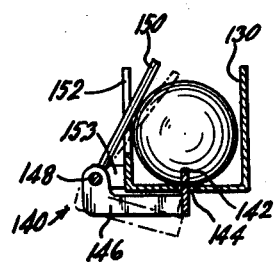
FIG. 5.

COLOR RECOGNITION SYSTEM

This is a continuing application of Serial No. 619,896, filed Oct. 6. 1075, now U.S. Pat. No. 4,042,491.

The invention relates to a color discrimination system, and, in particular, to a color discrimination system which distinguishes between an object of entirely one color and objects of partially or wholly different colors.

There have been many attempts in the past to develop systems which will recognize and distinguish between the colors of various objects. One such system, disclosed in U.S Pat. No. 3,737,239, issued July 5, 1963, involved a spectral band width determination and cross-correlation technique for distinguishing objects of different colors. While such a system may provide accurate color separation, it is extremely complex and relatively expensive.

Accordingly, it is an object of the invention to overcome the deficiencies in the prior art color recognition systems and provide a color discrimination system which is accurate while being relatively inexpensive and less complex than the prior systems.

It is a further object of the invention to provide a color discrimination system which can be used to distinguish between an object having a single color and objects having wholly or partially different colors. In particular, it is an object of the invention to provide such a system which can be utilized in a game of pool to distinguish the entirely white cue ball from the wholly or partially differential colored object balls.

Still further, it is an object of the invention to incorporate such a color discrimination system into a pool ball separating system so that the cue ball and object balls can be separated and diverted into independent storage areas.

In accordance with the present invention, the color of an object is distinguished by detecting the amount of electro-magnetic radiation reflected from the object's surface. This quantity is converted into an electrical signal, the magnitude of which depends on the color of the object. In a particular embodiment of the color discrimination system, there is included a housing having a sensing station at which are cooperatively mounted a plurality of light sources and light detectors. The outputs of the light detectors are coupled to one input of a comparator circuit in such a way that this comparator input is approximately equal to the largest of the detector outputs. The other input to the comparator is a pre-set reference signal. When an object passes the sensing station, light from the light source is reflected from the object to the light detectors producing an electrical signal therefrom. The magnitudes of the electrical signals are compared with the pre-set reference signal and the result of this comparison is an indication of the color of the object.

The color discrimination system finds particular application in a coin-operated pool table such as is generally found in amusement areas and the like. In such a pool table, the object balls are generally stored in a collector or storage station within the pool table and not made available to the player until the player inserts the proper amount of money into a coin-operated release mechanism. During the play of the game, it is required that once an object ball is sunk into one of the pockets on the pool table, it be returned to the collector station and no longer available to the player. However, should the cue ball be accidentally sunk, it must be made available to the player so that the game can continue. Therefore, the cue ball cannot be diverted into the object ball collector station but must be diverted into a different collector station from which it will be available.

To accomplish this result the color discrimination system is incorporated into the pool table for distinguishing between the entirely white cue ball and the wholly or partially differently colored object balls. The pool table includes a housing having a sensing station and two collecting stations positioned downstream of the sensing station. The housing also has a ball-diverting station positioned between the sensing station and the collecting stations. As a ball rolls past the sensing station an electrical signal is produced in the color recognition system which is dependent upon whether the ball is an entirely white cue ball or an object ball. This electrical signal is coupled to operate a pivot member in the ball-diverting station. If the cue ball is detected, the pivot member diverts the cue ball to the cue ball storage station from which it can be retrieved. If an object ball is detected, the pivot member permits the object ball to be diverted to the object ball storage station within the pool table housing. In this manner the cue ball and object balls are separated.

These and other objects and advantages of the invention will become substantially apparent as more fully herein described and claimed, reference being had to the accompanying drawings forming a part hereof, wherein all the numerals refer to like parts throughout, and in which:

FIG. 1 is a diagrammatic representation of a pool table incorporating the color discrimination system of this invention to separate the cue ball from the object balls and divert the object balls into a first storage area which is not accessible during the play of the game and the cue ball into a second storage area which is accessible during the play of the game;

FIG. 2 is an electrical schematic diagram of the color discrimination system with a diagrammatic representation of the light sources and light detectors;

FIG. 3 is a plane elevation view of a portion of the pool table housing incorporating the color recognition system;

FIG. 4 is a sectional view of a portion of the pool table housing taken along line 4—4 of FIG. 3.

FIG. 5 is a sectional view of the pool table taken along line 5—5 of FIG. 3 and showing a portion of the diverting station;

FIG. 6 is a sectional view taken along line 6—6 of FIG. 3 and showing an arrangement for insuring a minimum separation between pool balls passing the sensing station;

FIG. 7 is a sectional view taken along line 7—7 of FIG. 3 and showing the details of the sensing station.

Referring now to the drawings in detail, there is shown an illustrative embodiment of the color discrimination system incorporated into a pool table. FIG. 1 shows a coin-operated pool table 10 having the usual playing surface and pockets therein mounted on a suitable housing or frame. Slidably mounted within the frame is a compartment 14 which includes a coin collector 16, and a ball-separating system including a color recognition system. Compartment 14 includes a storage station 18 for the object balls 19. A storage station 20 is provided for the cue balls 21 so that the cue ball is available during the play of the game.

As is well known, the game of pool is played with an entirely white cue ball and object balls which may be striped and are partially white or entirely of a different color. The pool table is provided with a color recognition system which distinguishes between the cue ball and the object balls so that the cue ball can be diverted into one storage area, and the object balls diverted into a separate storage area.

The color discrimination system includes a sensing station 30 shown in greater detail in FIG. 7 and the associated electronic circuits shown in FIG. 2 for distinguishing the colors of the objects and particularly for the embodiment shown, for distinguishing between the colors of the cue ball and object balls.

Mounted at sensing station 30 are a plurality of electrogmagnetic radiation devices 32A through 32D, having substantially the same characteristics, such as light-emitting diodes or other light sources positioned at intervals of approximately 45° around the circumference of the sensing station. Cooperatively mounted with each device 32A-32D are radiation detectors 34A-34D having substantially the same characteristics, respectively, responsive to the energy emitted from devices 32. These detectors can be phototransistors or other radiation detection devices which are well known in the art. Electromagnetic radiation device 32a through 32d and associated radiation detectors 34a through 34d form detecting units, each detecting unit including an electromagnetic radiation device and its associated radiation detector. Mounted in a separate compartment 36 is another electromagnetic energy-emitting device 38 and detector 40 having substantially the same characteristics as the devices 32 and 34, respectively, which provide a refernce signal utilized in the circuit as will be explained low. The use of such a reference compensates for aging of the devices and power supply variations and thus increases the accuracy of the system. An electrical switch 42 is mounted at the bottom of the sensing station and activates the entire electronic circuit including the phototransistors and light sources only momentarily as a ball rolls through the sensing station thereby conserving power and prolonging the life of the sensing system for an indefinite period of time.

As shown in FIG. 7, when a ball, such as object ball 44, rolls into the sensing station 30, switch 42 is depressed and light is emitted from each light source 32A-32D and reflected from the ball to the detectors 34A-34D, producing an output voltage from these detectors proportional to the radiation reflected from the ball. Light reflected from the white surface of a ball will produce a relatively low signal from the detectors while light from the colored portion of a ball will produce a relatively higher output signal from the detectors. In FIG. 7 light is shown being reflected from the white areas of ball 44 and detected by detectors 32A-32C while light reflected from the colored portion of the ball is detected by detector 34D. The light sources and detectors are arranged in the sensing station so that at least one of the emitter-detector pairs will be opposite a colored portion of any object ball which rolls through the sensing station. This requirement is satisfied by using four emitter-detector pairs. Of course, the arrangement of emitters and detectors can be readily varied to accommodate objects of various colors and color patterns.

The signals from the detectors 34A-34D are compared with the reference signal from detector 40 and if all the signals are lower than the reference level, indicating the presence of a white cue ball, a high level output signal is provided by the comparator. On the other hand, if one or more of the signal levels is higher than the reference level, indicating an object ball, the comparator output signal is low. Thus, the output signal from the comparator is indicative of the color of the object which passes the sensing station.

The electrical circuit for processing the signals from detectors 34A-34D and 40 is shown in FIG. 2. As shown, the radiation-emitting devices 32A-32D and 38 are connected in series through a resistor 50 and switch 42 to a source of electrical potential, such as a 12 volt battery supply. Each phototransistor 34A-34D is connected in series with a fixed resistor 52A-52D respectively and a variable resistor 54A-54D respectively. The variable resistors compensate for variations in the characteristics of the phototransistors and other differences which may exist in the various circuits. Reference phototransistor 40 is coupled to the source of voltage through variable resistors 56, 58 and fixed resistor 60. The variable resistors 56 and 58 provide an adjustment for the reference voltage to compensate for variations in the colors of the balls and various other abnormal conditions which could exist in the circuit.

The voltages at the junction of the phototransistor-resistor combinations, which are dependent upon the light energy incident from the associated light source, are coupled through diodes 62-68 respectively to the inverting input of an operational amplifier 70. The diodes 62-68 are connected in an OR configuration so that the voltage at the inverting input is about equal to the highest voltage from the four phototransistor-resistor combinations. The inverting input is also coupled to ground via resistor 72. The reference phototransistor 40 is coupled through diode 74 to the noninverting input of the operational amplifier 70. Coupled between the noninverting input and ground is a parallel resistor capacitor network 74-76. Operational amplifier 72 operates as a comparator to compare the voltage at its non-inverting and inverting inputs. If a cue ball is present at the sensing station, the voltages at the anodes of diodes 62-68 are equal and relatively low. The voltage at the noninverting input exceeds the voltage at the inverting input, therefore producing a relatively high output voltage from the comparator. If an object ball is present, one of the voltages at the anodes of diodes 62-68 will be high and this high voltage will be applied to the inverting input to comparator 70. This voltage exceeds the reference voltage producing a relatively low voltage output from comparator 70.

In the coin-operated pool game illustrated, the output of the comparator is used to drive a solenoid which is part of a ball separating system. To this end, the comparator output is applied to a transistor driving network including transistor 78, resistors 80, 82, 84 and 86 and capacitors 87, 88 and 90 which activate a solenoid, represented by coil 92 when a high voltage appears at the comparator output in response to sensing of a cue ball. Solenoid 90 is positioned at a diverting station, and when operated, permits the cue ball to be diverted into a cue ball storage station. The solenoid is activated for a time interval which is small compared to the interval during which the cue ball is present in the sensing station. This feature, which is accomplished by a rapid charging of capacitor 87, conserves power supply energy. If the solenoid is not activated, the object ball rolls into an object ball storage compartment.

Referring now to FIGS. 3-5, there are shown details of the ball separation system for a pool table. The ball separator includes a diverting station 100 positioned downstream of sensing station 30 for diverting the cue ball into cue ball storage station 20 and object balls into object ball storage station 18. Trough 104 in storage station 18 is pivotable in response to the insertion of money into the coin collector 13 to make the object balls available to the player at the beginning of the game.

Mounted at diverting station 100 is a horizontal plate 104 having pins 106 projecting therefrom. Plate 104 has a second plate 110 slidably mounted thereon with pins 106 projecting through slots 112. Plate 110 has a square cut-out portion 112 which receives the lower end of plate 114 operatively connected to solenoid 92. A vertical pin 116 mounted on the forward end of plate 104 engages one end of spring 118, the other end of which is secured to the housing. Secured to the rearward end of plate 104 is a rearwardly extending arm 120, having a flange or shoulder 122 proximate its rearward end. Arm 120 extends through a hole in plate 124 which is pivotably mounted to the housing. Pivotably mounted to the housing is arm 126 having a rearward end extending through a hole in plate 104 and terminating at its rearward end in flange 128.

In operation, pool balls roll through channel 130 in the pool table housing after being sunk in one of the pockets in the table and pass through sensing station 30. If the ball is an object ball, solenoid 92 is not activated and the ball, on encountering arm 126, pivots that arm upward and continues to roll, as indicated by arrow 132, into trough 104. If the ball is a cue ball, solenoid 92 is activated, forcing plate 114 out of slot 112, thereby allowing spring 118 to urge plate 110 forward over flange 128 of arm 126 to prevent the pivoting of arm 126. The cue ball now encounters arm 126 and is diverted by the arm in the direction of arrow 134 into the cue ball storage area 20. As the cue ball rolls into area 20, it strikes plate 124, pivoting plate 124 into contact with flange 122 of arm 120, thereby forcing arm 120 rearward until plate 114 reengages slot 112 in plate 110, resetting the diverting station to receive the next ball.

To provide a minimum separation between balls passing through the sensing station, there is ball delay system 140 positioned in channel 130 forward of the sensing station. This system insures that the ball separator has sufficient time to direct a ball to its proper storage channel and be reset to await the arrival of the next ball.

With particular reference to FIGS. 3, 4 and 6, the spacer system includes a lever 142 positioned longitudinally within slot 144 formed in channel 130. Secured to lever 142 are spaced lever arms 146 and 147, which in turn are secured to cross rod 148. Also connected to rod 148 is lever arm 150, which extends through channel 152 into channel 130. The entire lever arm structure is pivotably mounted to channel 130 by supports 153. A spring 154 wound around shaft 148 is arranged to urge lever 150 out of channel 130.

In operation, when a ball rolls into channel 130 and approaches the sensing station, it comes in contact with lever 142 causing lever 142 to pivot into slot 152, thereby blocking channel 130. The channel remains blocked during the time that the ball passes over slot 142, thereby preventing another ball from approaching the sensing station. When the first ball passes from channel 130 into sensing station 30, spring 154 urges lever arm 150 out of channel 130, returning lever 142 to its position extending into channel 130 and permitting the next ball to roll through channel 130 to the sensing station. In this manner, a miminum separation between balls approaching the sensing station is maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim is:

1. A color discrimination system for distinguishing between objects of different colors comprising a housing having a sensing station, means in said housing for directing an object to said sensing station, a plurality of detecting units mounted in the housing at the sensing station, each of said detecting units including a source of electromagnetic energy and an associated detector responsive to electromagnetic energy emitted by the source of electromagnetic energy of the detector unit, each of said detector units arranged so that each source of electromagnetic energy directs electromagnetic energy different portion of the object when the object is at the sensing station and each of said detectors is responsive only to electromagnetic energy transmitted to the object by its associated source of electromagnetic energy in the detector unit and reflected from the object to the detector, each of said detectors producing a detector signal representative of the color of a different portion of the object, means for producing a reference signal at a predetermined level, comparator means in said housing having a first imput coupled to receive each detector signal and a second input coupled to receive the reference signal for comparing the detector signals with the reference signal to produce a signal dependent upon the color of the object.

2. The system of claim 1 wherein said means for producing a reference signal includes a reference source of electromagnetic energy and a detector responsive only to electromagnetic energy emitted by said reference source.

3. A color discrimination system for distinguishing between objects of different colors comprising a housing having a sensing station, means in said housing for directing an object to said sensing station, a plurality of detecting units mounted in the housing at the sensing station, each of detecting units including a source of electromagnetic energy and an associated detector responsive to electromagnetic energy emitted by the source of electromagnetic energy of the detector unit, each of said detector units arranged so that each source of electromagnetic energy directs electromagnetic energy to a different portion of the object when the object is at the sensing station and each of said detectors is responsive only to electromagnetic energy transmitted to the object by its associated source of electromagnetic energy in the detector unit and reflected from the object to the detector, each of said detectors producing a detector signal representative of the color of a different portion of the object, a reference source of electromagnetic energy and a detector responsive only to electromagnetic energy emitted by said reference source of electromagnetic energy to produce a reference signal at a predetermined level, comparator means in said housing having a first input coupled to receive each detector signal and a second input coupled to receive the reference signal for comparing the detector signals with the reference signal to produce signals dependant upon the color of the object.

4. The system of claim 3 further including switch means coupling a source of power to said sources of electromagnetic energy and said detectors, said switch means positioned in the housing in cooperation with the path of travel of said object for activating said sources of electromagnetic radiation and said detectors only for a time sufficient to permit the color of the object to be determined.

5. The system of claim 4 wherein said switch means is positioned at the sensing station in the path of travel of the object, said object activating said switch means when in the sensing station.

6. The system of claim 3 wherein said comparator means is arranged to produce a first output signal when all of the detector signals are below said reference signal and produce a second output signal when at least one of said detector signals is higher than said reference signal.

7. The system of claim 6 wherein said housing further includes a diverting station downstream of said sensing station, means for directing an object from said sensing station to said diverting station, a plurality of object receiving compartments downstream of said diverting station, said object diverting station including diverting means responsive to said output electrical signals and positioned with respect to the path of travel of said objects from said sensing station for directing an object into a first of said object receiving compartments in response to said first output signal and for diverting said object into a second of said object receiving compartments in response to said second output signal.

* * * * *